(No Model.)
J. W. CURETON & J. KAINO.
ROTARY HARROW.
No. 323,299. Patented July 28, 1885.
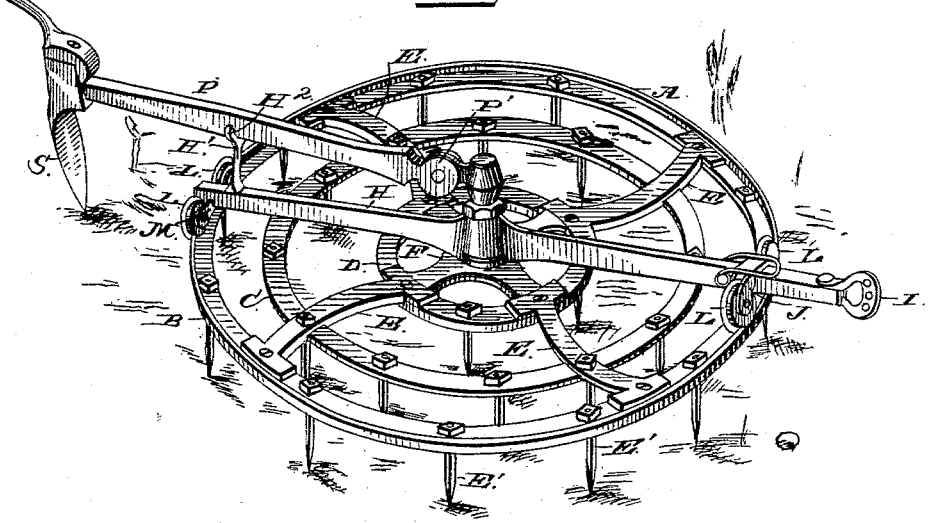
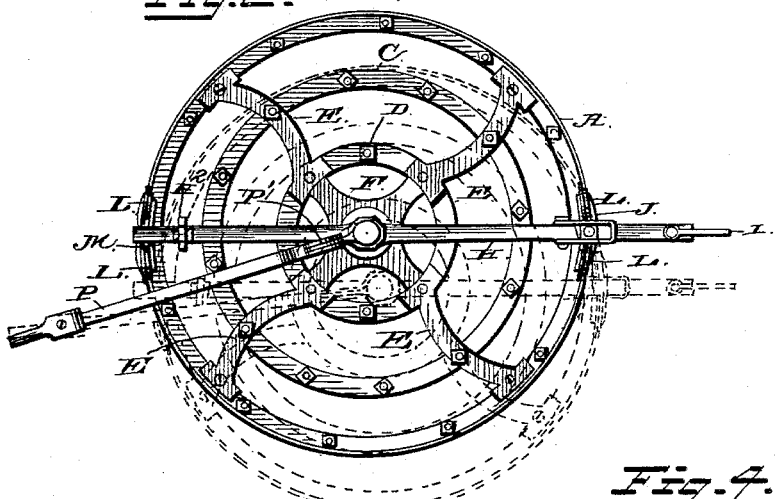
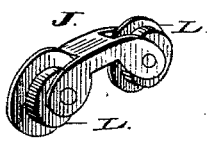
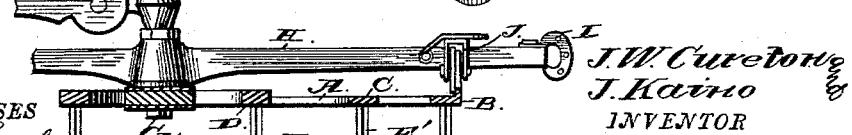
WITNESSES
J. W. Cureton
J. Kaino
INVENTOR
by C. A. Snow & Co.
Attorneys

UNITED STATES PATENT OFFICE.

JOHN WESLEY CURETON AND JOHAN KAINO, OF CUFFEY'S COVE, CALIFORNIA.

ROTARY HARROW.

SPECIFICATION forming part of Letters Patent No. 323,299, dated July 28, 1885.

Application filed January 9, 1885. (No model.)

*To all whom it may concern:*

Be it known that we, JOHN W. CURETON and JOHAN KAINO, citizens of the United States, residing at Cuffey's Cove, in the county of Mendocino and State of California, have invented a new and useful Improvement in Rotary Harrows, of which the following is a specification, reference being had to the accompanying drawings.

Our invention has relation to rotary harrows designed more especially for use in orchards and vineyards; and it consists in the construction and novel arrangement of parts, as will be hereinafter fully described and claimed.

In the drawings, Figure 1 is a view in perspective of a rotary harrow embodying our improvements, and Fig. 2 a plan view, the dotted lines showing the harrow thrown to one side, which is done to avoid a tree or grapevine, as the case may be. Fig. 3 is a vertical sectional view. Fig. 4 is a detached view of one of the trucks carrying the wheels.

Referring by letter to the accompanying drawings, A designates the harrow-frame, which is composed of three or more annular concentric tooth-bars, B, C, and D, which are connected by curved radial arms E, and are provided with harrow-teeth E.

The smaller inner annular tooth-bar, D, is provided with a spider, F, from which a spindle, G, which forms the journal of the rotary harrow, projects upwardly. Upon the spindle G the draft-beam H of the harrow is journaled. The draft-beam H is provided at its forward end with a clevis, I, for the attachment of the single-tree, and a short distance in rear of the clevis the draft-beam H is provided with a small truck, J, which is secured to the draft-beam and provided with two small flanged wheels, L L, which travel on the flanged outer tooth-bar, B. At its rear end the draft-beam H is provided with a second truck, M, upon which the rear end of the draft-beam rests; and this truck M is also provided with flanged wheels L L, which travel on the flanged outer tooth-bar, B.

The handle P, by which the harrow is controlled, is connected to the upper end of the spindle G by a knuckle-joint, P', so that the handle P has both vertical and horizontal movement.

Near the rear end the draft-beam H is provided with a standard, H', having a fork, H², at its upper end, in which the handle P rests when the harrow is working in sufficient room. When, however, a vine or tree is approached, the horse can be driven straight along as close to the vine or tree as need be, and the handle should be then lifted from its fork and moved to the side and the plow-foot S stuck into the ground at an angle to the present line of draft, which will cause the harrow to swing over and form a new line of draft that will enable the driver to pass the vine or tree with the harrow, after which he can move the plow-foot S to an angle that will cause the harrow to rotate back into the original line of draft. In this manner the driver can harrow very close to the tree or vine, and the horse can be made to perform the labor of shifting the harrow, with the exception of that portion of the labor required to move the plow-foot to the proper angle.

Having thus fully described our invention, what we claim as new, and desire to secure by Letters Patent of the United States, is—

1. The combination, with the connected annular harrow-beams provided with harrow-teeth and a central vertical journal, of the draft-beam provided with trucks and flanged wheels and the vertical forked standard, and the pivoted hinged handle with the plow-foot at free end, substantially as specified.

2. The combination, with the connected annular harrow-beams, with the central vertical journal and peripheral flanged truck, of the draft-beam provided with trucks having flanged supporting-wheels, the vertical forked standard, and the pivoted hinged handle with the plow-foot and hand-piece, substantially as set forth.

In testimony that we claim the foregoing as our own we have hereto affixed our signatures in presence of two witnesses.

JOHN WESLEY CURETON.
JOHAN KAINO.

Witnesses:
M. E. DIAMOND,
J. H. DIAMOND.